(No Model.)  5 Sheets—Sheet 1.
F. H. CHASE.
RAISIN SEEDER.
No. 581,809.  Patented May 4, 1897.
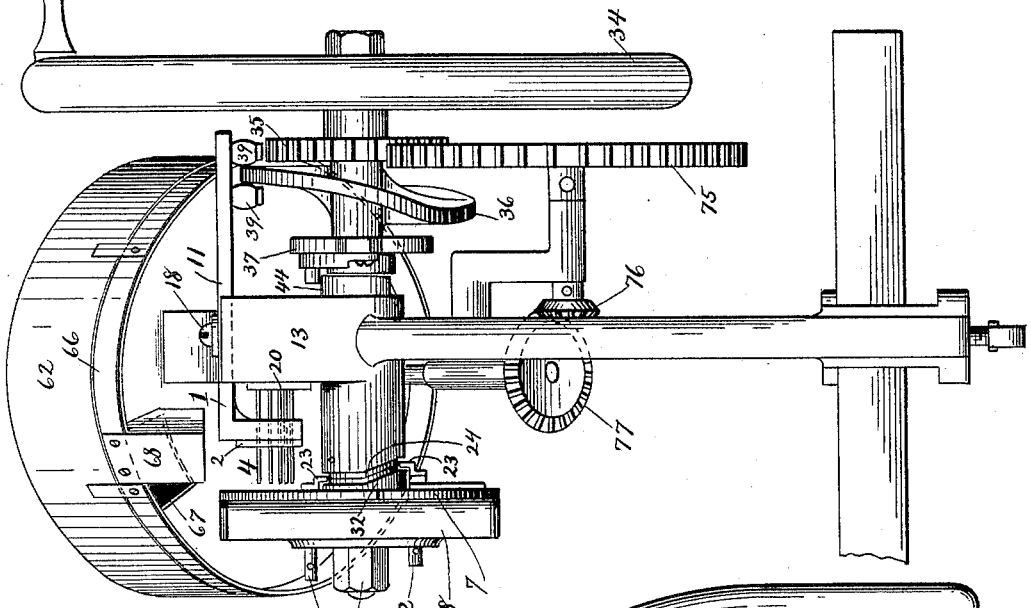
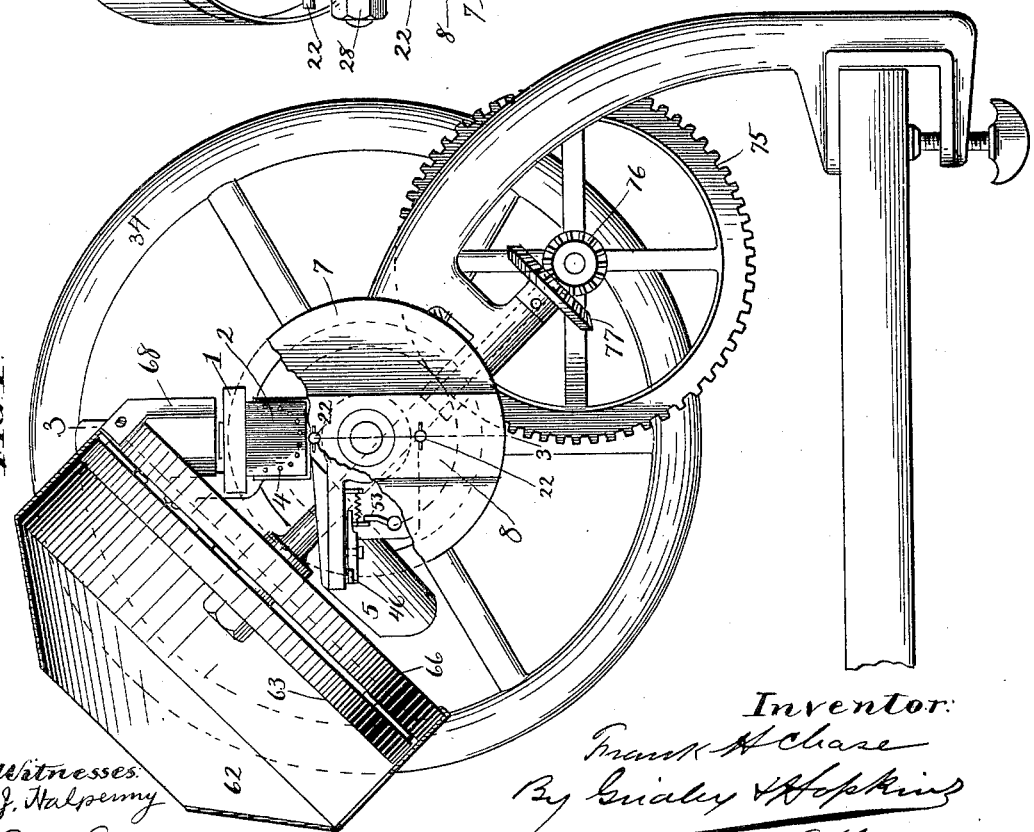
Witnesses:
J. Halpenny
S. P. Sharon
Inventor:
Frank H. Chase
By Gridley & Hopkins
Attys.

(No Model.) 5 Sheets—Sheet 2.

F. H. CHASE.
RAISIN SEEDER.

No. 581,809. Patented May 4, 1897.

Witnesses:
J. Halpenny
S. E. Sharon

Inventor:
Frank H. Chase
By his attorneys
Bradley & Hopkins (No Model.)  5 Sheets—Sheet 3.

F. H. CHASE.
RAISIN SEEDER.

No. 581,809.  Patented May 4, 1897.

Witnesses:
J. Halpenny
S. E. Sharon

Inventor:
Frank H. Chase
By Grisly & Hopkins
Attys.

(No Model.) 5 Sheets—Sheet 4.
F. H. CHASE.
RAISIN SEEDER.
No. 581,809. Patented May 4, 1897.
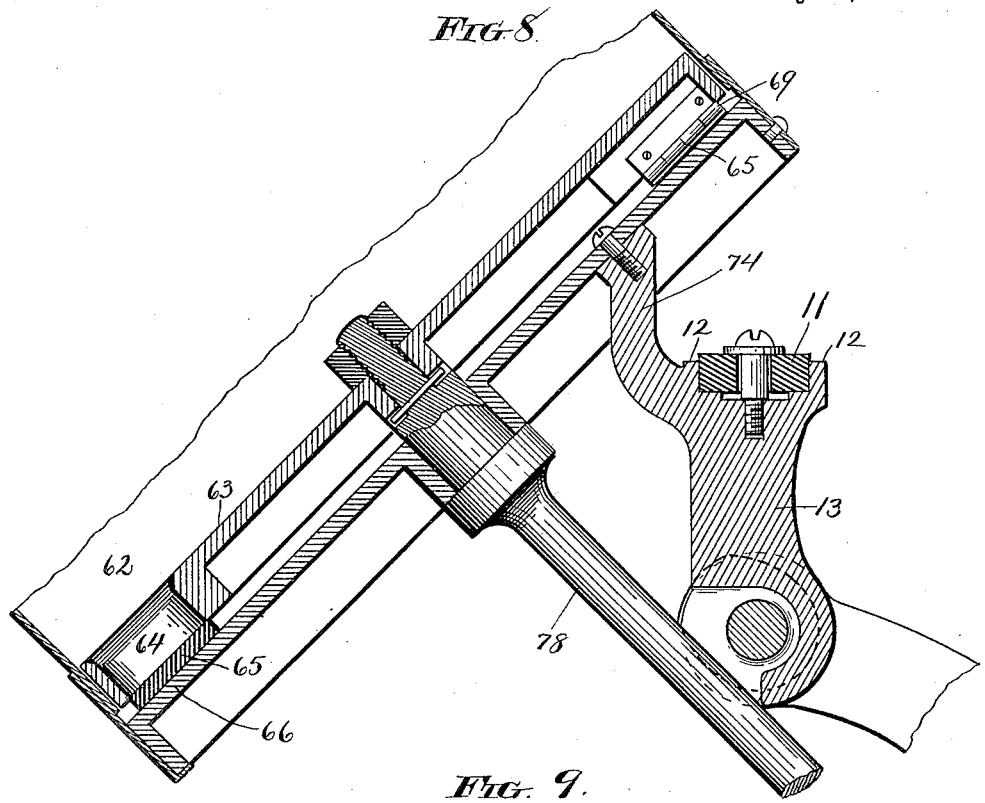
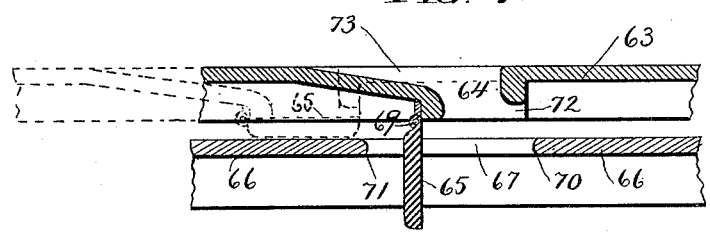
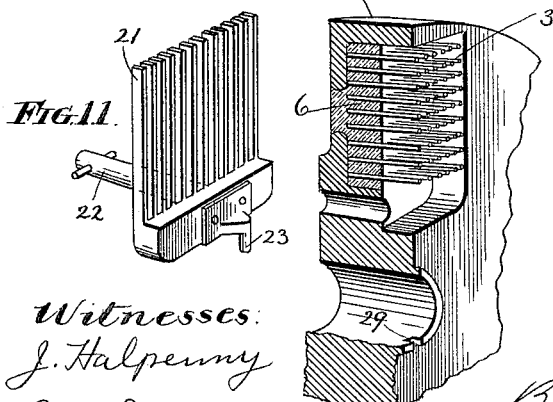
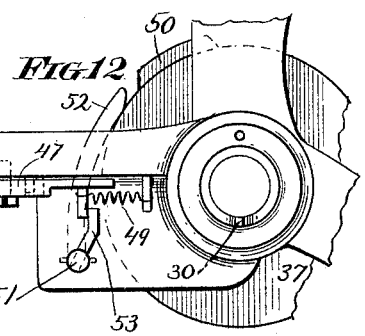
Witnesses:
J. Halpenny
S. E. Sharon
Inventor:
Frank H. Chase
By Gridley & Hopkins
Attys.

(No Model.)

F. H. CHASE.
RAISIN SEEDER.

No. 581,809. Patented May 4, 1897.

Witnesses:
J. Halpenny
S. E. Sharon

Inventor:
Frank H. Chase
By Gurley & Hopkins
Attys

United States Patent Office.

FRANK HOWARD CHASE, OF CHICAGO, ILLINOIS.

RAISIN-SEEDER.

SPECIFICATION forming part of Letters Patent No. 581,809, dated May 4, 1897.

Application filed June 13, 1895. Serial No. 552,672. (No model.)

*To all whom it may concern:*

Be it known that I, FRANK HOWARD CHASE, a citizen of the United States, residing at Chicago, in the county of Cook and State of Illinois, have invented certain new and useful Improvements in Raisin-Seeders, of which the following is a specification, reference being had to the accompanying drawings, which are made a part hereof, and in which—

Figure 3:
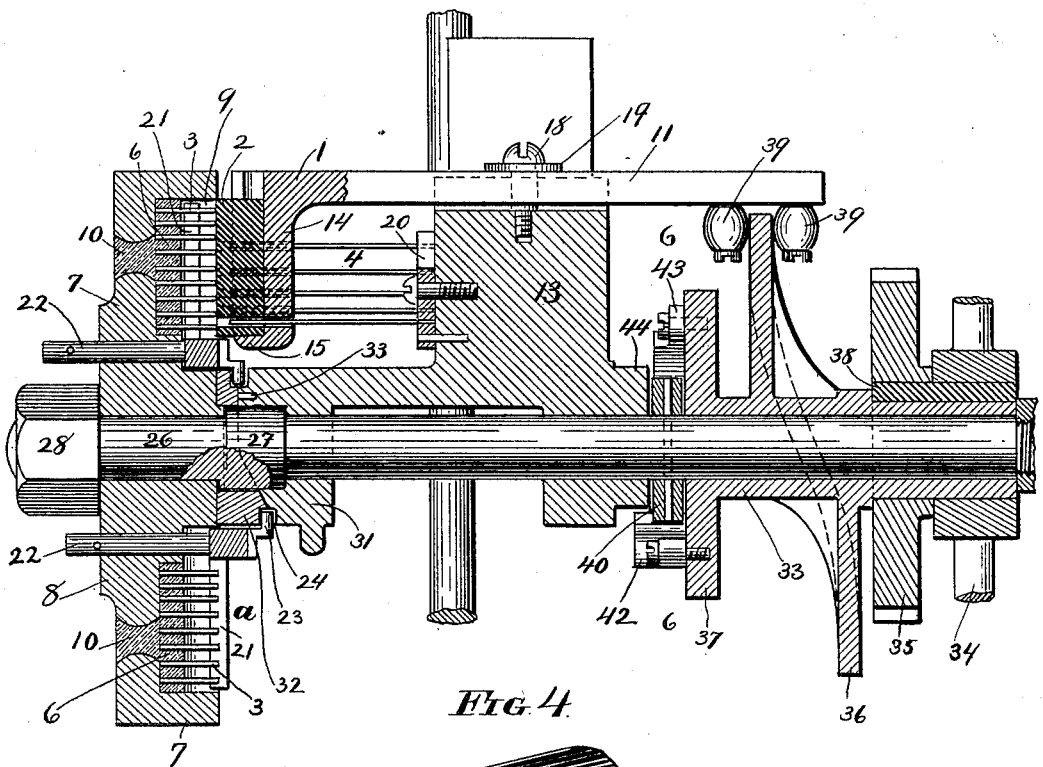
Figure 4:
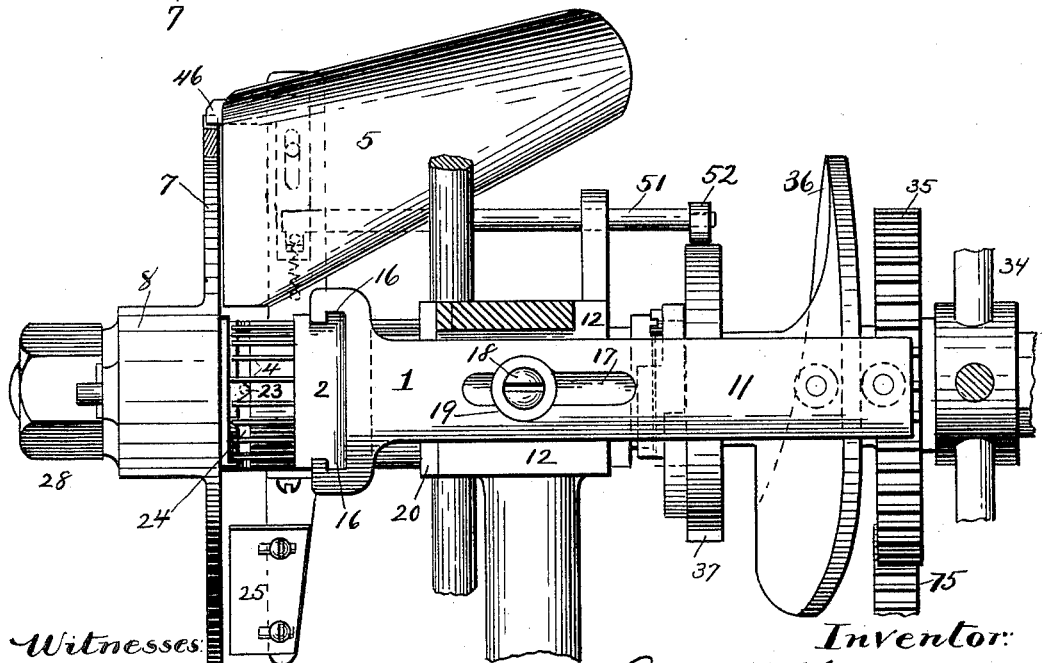
Figure 5:
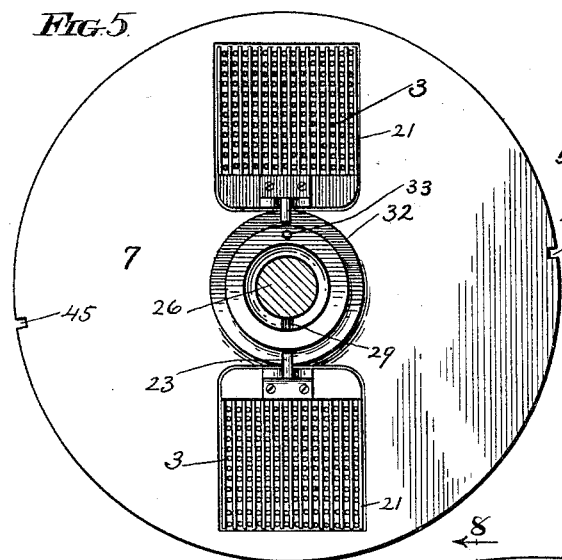
Figure 6:
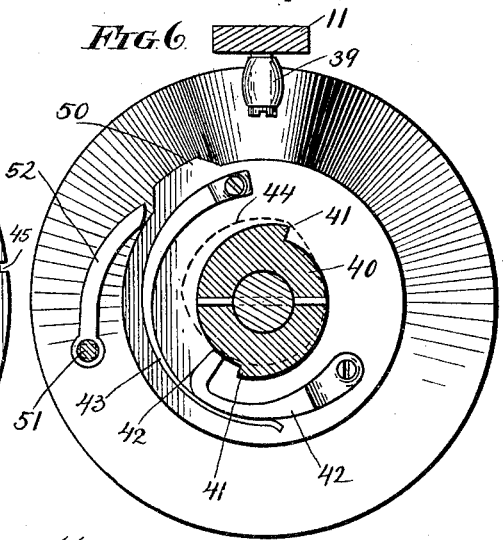
Figure 7:
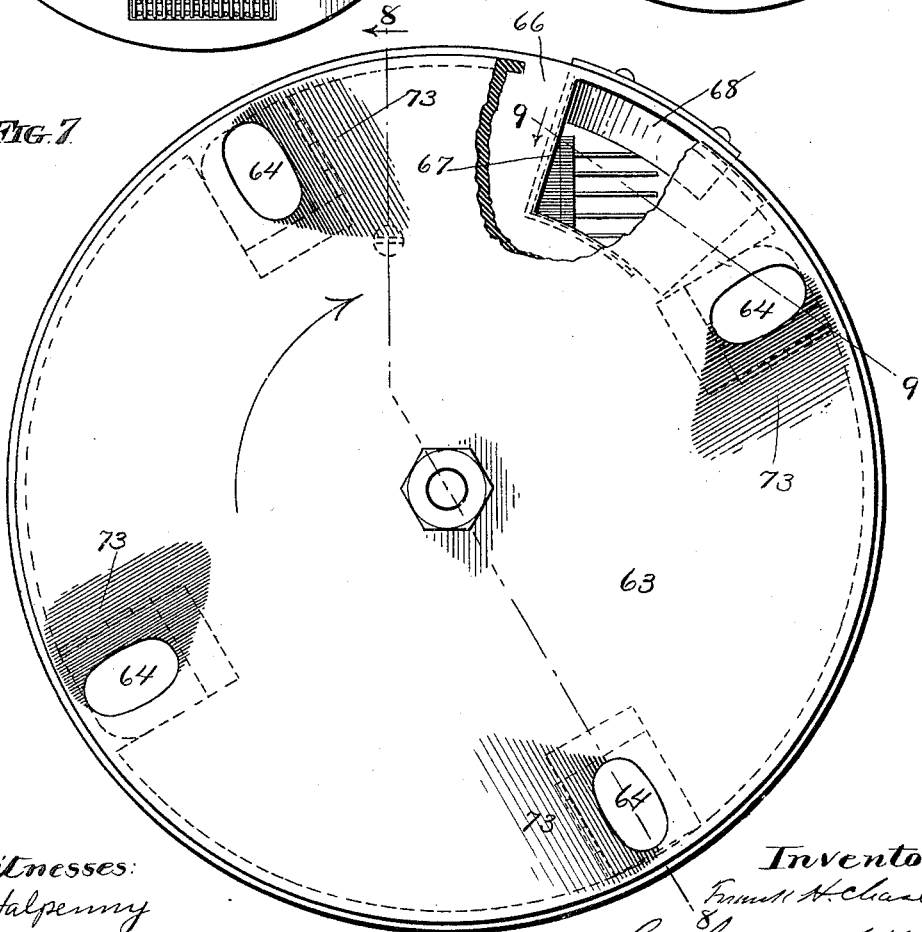
Figure 13:
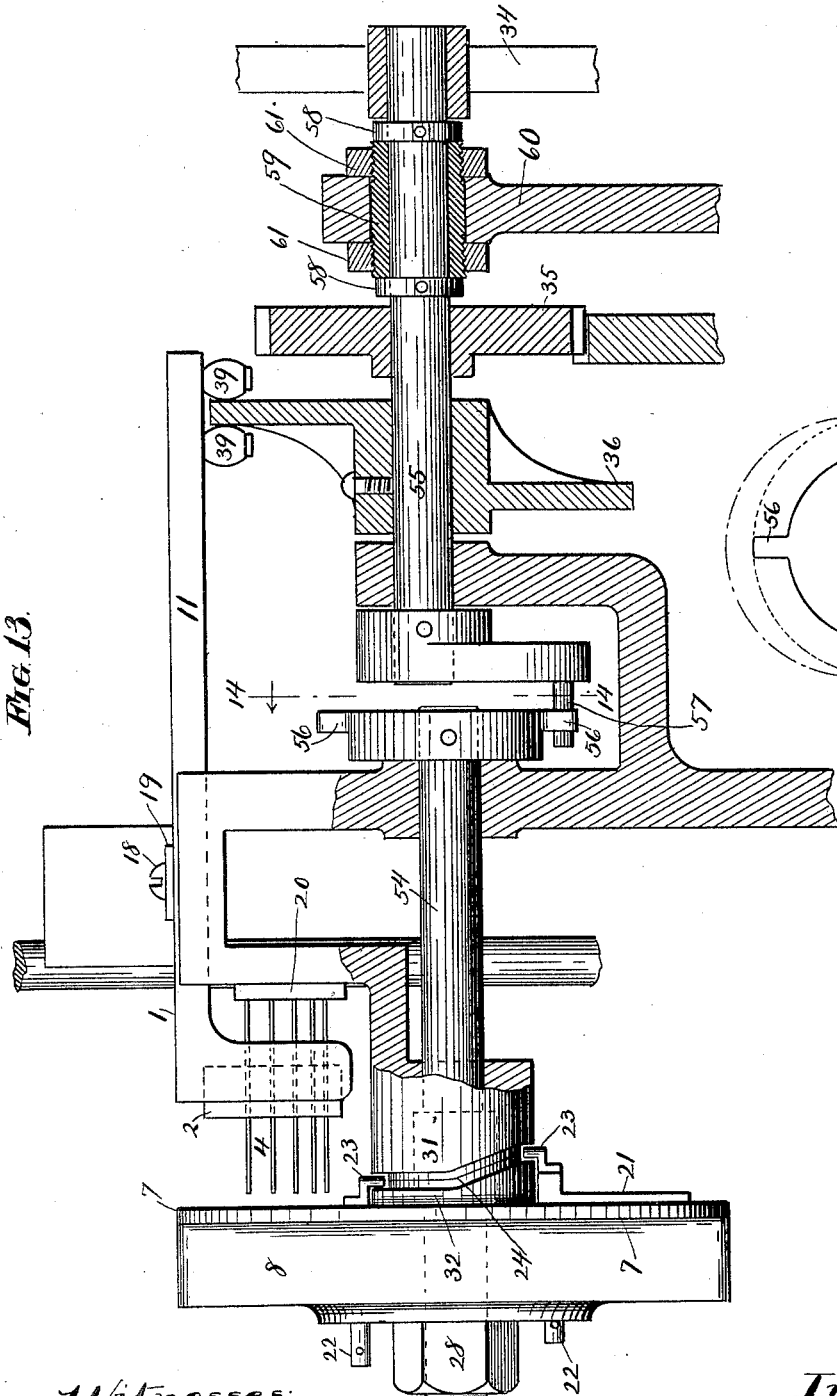
Figure 14:
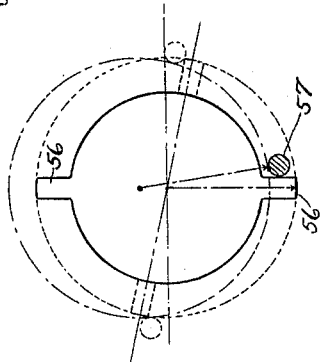

Figure 1 is a side elevation of a raisin-seeder embodying the invention, portions being broken away. Fig. 2 is a rear elevation thereof. Fig. 3 is a vertical section of portions thereof on a larger scale, the cutting plane being indicated by the line 3 3, Fig. 1. Fig. 4 is a plan view of the parts shown in Fig. 3. Fig. 5 is a face view of the pulp-receiver, the pulp-ejector, and the disk by which they are carried. Fig. 6 is a vertical section on the line 6 6, Fig. 3, showing more especially the cam for operating the plunger, the mechanism for transmitting intermittent movement to the disk carrying the pulp-receiver, and the mechanism for tripping the dog by which said disk is restrained against movement while the raisin is being impaled. Fig. 7 is a plan view of a portion of a feeder, the hopper being omitted and a portion of the cell-disk being broken away in order to show the opening through which the raisins are dropped into the cradle. Figs. 8 and 9 are sections of the feeder on the lines 8 8 and 9 9, respectively, Fig. 7, looking in the direction of the arrows. Fig. 10 is a perspective view, on a larger scale, of a fragment of the pulp-receiver and of the disk by which it is carried. Fig. 11 is a perspective view of one of the pulp-ejectors. Fig. 12 is an elevation showing in detail the mechanism for transmitting movement to and for dogging the disk by which the pulp-receiver is carried. Fig. 13 is a vertical section of portions of a machine embodying, in its preferred form, the means for intermittently rotating the disk by which the pulp-receiver is carried and the means for adjusting the coöperating seeding devices with relation to each other. Fig. 14 is a diagram showing the manner in which the transmitting mechanism shown in Fig. 13 operates.

The present invention consists in the features of novelty that are particularly pointed out in the claims hereinafter.

In the machine shown in the drawings there is a reciprocating plunger 1, carrying one of the seeding devices, the coöperating seeding device (or a series of them) being carried by a part to which an intermittent movement is given, a cradle 4, by which the raisin is supported between the seeding devices until it is impaled, and a feeder by which the raisins are dropped one at a time into the cradle. In the illustration given the seeding device carried by the plunger consists of an elastic pad 2, and the coöperating seeding devices carried by the intermittently-movable part consist of the pulp-receivers 3.

The movement of the several parts is so timed that as the plunger is making its backward stroke the pulp-receiver is moved out of the path of the plunger past a scraper 5, by which the seeds are dislodged, after which the pulp-ejector ejects the pulp, and about the time that the plunger completes its backward stroke the raisin falls into the cradle and the next pulp-receiver reaches its position in the path of the plunger and is there stopped.

The pulp-receiver consists, essentially, of a series of small pins arranged parallel with each other and preferably in intersecting rows at such distances apart that the seed of the raisin cannot enter between them. They are all secured in a backing 6, of Babbitt metal or other suitable material, and this backing is in turn secured to the intermittently-movable part 7, by which they are carried. Preferably the part 7 takes the form of a disk having where each of the receivers is to be located an enlargement 8, and in this enlargement is formed a recess 9 of such depth that the outer extremities of the pins of which the receiver is made up terminate in the plane of the face of the disk. The advantage in having the surfaces of the pins of which the pulp-receiver is made up terminate in the plane of the face of the disk is that it makes it absolutely impossible for any seeds to adhere to the pulp-receiver and be carried past the seed-scraper. The backing 6 is secured in this recess permanently by a tongue 10, projecting from its back and through an opening in the back of the enlargement 8. In assembling these parts the pins are arranged in a perforated block which is coextensive in area with the recess 9 and from which projects those portions of the pins which are shown in the drawings as being embedded in the backing 6, and when this block and the pins are placed in the recess the molten metal of which the backing is made is run through the opening in the back of the disk and fills all the spaces around the projecting portions of the pins and also the opening, thereby permanently securing the pins in place.

The plunger preferably consists of a sliding part 11, which fits between suitable guides 12, formed upon an arm 13 of the frame of the machine, and a depending head 14, having in its outer face a socket for receiving the elastic pad 2. This socket preferably takes the form of an undercut groove closed at bottom by a flange 15, projecting from the head 14 and forming a support for the pad, the latter being provided at its edges with tongues 16, that occupy the grooves. The part 11 of the plunger is provided with a longitudinal slot 17, through which projects a screw-bolt 18, between whose head and the top surface of the plunger is arranged a washer 19, and by these means the plunger is restrained against horizontal and vertical displacement, while being left perfectly free to move endwise.

The cradle 4 consists of a number of wires or slender rods all secured at one end to a plate 20, which in turn is secured to the arm 13 of the frame of the machine. These wires or rods extend nearly to the surface of the pulp-receiver, and preferably the head 14 of the plunger and the elastic pad 2 are provided with perforations, each of which is occupied by one of the rods or wires.

So far as I am aware I am the first to use in a raisin-seeder a cradle for supporting the raisin in position to be impaled and an impaling device (such as the pad 2) which extends below the bottom of the cradle, and this is important for the reason that if the raisin were supported in such position that the impaling device did not extend below it when acted upon by the impaling device it would flatten and squeeze out beyond the bottom of the impaling device, so that it would not be perfectly impaled.

After the pulp-receiver has passed the seed-scraper 5 the pulp is ejected by the reciprocable ejector, which is shown more clearly in Fig. 11. This ejector has a series of blades or teeth 21, which fit between and alternate with the rows of pins of which the pulp-receiver is made up, a stem 22 occupying a perforation of the disk 7, whereby it is guided and confined to a strictly rectilinear movement in a direction perpendicular to the surface of the pulp-receiver and a finger 23, occupying a cam-groove 24. The course of this groove is such that while the pulp-receiver is traveling from its position in the front of the plunger to a position past the seed-scraper the ejector remains in its withdrawn position, after which it is projected, as shown at $a$ in Fig. 3. In its projected position the surfaces of the tongues or blades 21 are outside of and beyond the outer face of the pulp-receiver, and the pulp is free to fall. If, however, it should stick after this position is reached, it will come in contact with a scraper 25 and be dislodged, but before the pulp-receiver has reached this scraper the cam 24 will have again withdrawn the ejector.

For the purpose of cleaning it is desirable that the disk 7 and its accessories be removable, and to this end it is simply slipped onto the shaft 26 and there confined between a shoulder or collar 27, formed on said shaft, and a nut 28, and in order to key it to the shaft so that it partakes of the movement thereof any suitable device may be used. As shown in the drawings, the disk is provided with a notch 29, into which projects a tongue 30, formed on the shoulder 27, but any other suitable means for non-rotatively associating the disk and shaft may be used. The cam-groove is formed partly in an arm 31 of the frame and partly in a removable ring 32, having a pin 33, which projects into a perforation in said arm, whereby the ring 32 is prevented from turning. In other words, that part of the arm of the machine in which the cam-groove is formed is separated upon a line following said groove, resulting in a ring 32. The object of this construction is to enable the disk 7 to be removed from the shaft 26 without at the same time removing the ejectors, and the advantage of this is that it makes the reassembling of the parts very much easier.

Mounted loosely upon the shaft 26 is a sleeve 133, carrying the fly-wheel 34, a pinion 35, a cam 36, and a disk 37. The cam and disk are shown as being integral with the sleeve and the fly-wheel and pinion as being secured to it by a key 38; but the details in the construction and arrangement of the parts in no way affects the present invention, it being simply necessary that they be so associated that they will all move together as a single member. The cam projects between a pair of studs arranged on the part 11 of the plunger and provided with antifriction-rollers 39, and the shape of the cam is such that at each complete revolution it will advance and retract the plunger once. Preferably it is so graduated that the plunger is advanced very much more quickly than it is retracted, but this is not essential and the movement may be a more regular one, if desired. To the shaft is permanently secured a disk 40, having as many ratchet-teeth 41 as there are pulp-receivers, (two being shown in the present instance,) and to the disk 37 is pivoted a pawl 42, engaged by a spring 43, which is also secured to the disk. The face of the pawl is of greater width than the face of the ratchet-disk, so that it projects over a stationary cam 44, which is shown as being formed on a part of the frame of the machine. This cam is so shaped that at the instant when it is desired that the rotation of the shaft 26 shall cease (or, in other words, at the instant that the pulp-receiver reaches its position in front of the plunger) the cam disengages the pawl from its tooth and leaves it in position to engage the next tooth when reached. By this means the pulp-receiver is given an intermittent movement, and while this means for accomplishing this result is entirely practical, still I prefer to use the means shown in Figs. 13 and 14 and described hereinafter.

The parts that are non-rotatively secured to the shaft 26 will gain considerable momentum while the machine is at work, and it is therefore necessary, in order to insure that the pulp-receiver shall not be carried past its proper position with relation to the plunger, to provide a means for dogging it. To this end the disk 7 is provided in its periphery with notches 45, which are entered by a spring-actuated dog 46 as soon as the proper position is reached. This dog is preferably formed upon a slide 47, suitably secured to an arm 48 of the frame, and it is held normally in contact with the periphery of the disk by a spring 49. It is necessary, of course, to withdraw the dog before the disk can be again rotated, and this is done by a cam 50, arranged upon the periphery of the disk 37 and operating through the medium of a shaft 51, having a tappet 52 arranged in the path of the cam, and an arm 53 engaging the slide 47 or a part projecting therefrom. The cam 50 is so arranged that it comes in contact with the tappet 52 and withdraws the dog 46 just an instant before the pawl 42 engages the ratchet.

In the preferred means for intermittently moving the pulp-receiver, instead of using a shaft or sleeve mounted loosely thereon and pawl and ratchet for alternately engaging and disengaging them, I use two shafts 54 and 55, one of which, 54, carries the pulp-receivers and the other of which is permanently secured to the driving-wheel. These shafts are arranged end to end with their axes parallel, but not coincident. From the shaft 54 project radially as many arms or tappets 56 as there are pulp-receivers, and by the shaft 55 is carried a tappet 57, that travels in the path of the tappets 56 during only a part of each revolution of the shaft 55. The degree of eccentricity of the two shafts and the proportions of the parts are such that during a portion of each revolution of the shaft 54 each of the tappets 56 will project into the path of the tappet 57. If there are two pulp-receivers diametrically located, it will be necessary, of course, to move the shaft 54 through one-half of a complete revolution each time, and the tappets 56 and 57 must therefore be in engagement with each other during a corresponding interval. I believe myself to be the first to use this means for transmitting movement from one shaft to another and in transmitting it convert the continuous movement of one into an intermittent movement of the other, and while I have shown it embodied in a raisin-seeder still I desire to have it understood that I reserve to myself the exclusive right to use it in all other classes of machines.

Another reason for preferring this construction to that shown in the preceding figures of the drawings is that by simply adjusting the shaft 55 endwise the position of the coöperating seeding devices with relation to each other may be adjusted. To this end the shaft is provided with fixed shoulders or collars 58, between which is confined a sleeve or bushing 59, in which the shaft turns freely. This bushing occupies a perforation in an arm 60 of the frame of the machine and is provided on its exterior with screw-threads, upon which fit lock-nuts 61, that engage said arm 60. By changing the positions of these nuts the position of the shaft and the cam 36 is changed, and this in turn changes the position of the plunger.

This completes the description of the seeding part of my machine, leaving only the means for feeding the raisins to it to be described, and while I prefer to use a feeder of some sort, still, if desired, the feeder may be dispensed with and the raisins fed to the machine by hand.

The feeder shown consists of a hopper 62, a cell-disk 63, having any desired number of cells 64, a valve 65 for each of said cells, a track or way by which the valves are held normally closed, said track or way being interrupted at the point where it is desired that the valve shall fall away and open the cells in succession, so as to permit their contents to be discharged. As shown in the drawings, this track or way is simply a disk 66, but so far as the office of holding the valves closed is concerned the only operative part of this disk is the surface upon which the valves rest and slide, the interruption in the track being simply an opening 67, formed through the disk directly over the cradle 4. Preferably a shield 68 is secured to the disk in the vicinity of the opening 67 for the purpose of guiding the raisins in their descent and insuring that they fall in the hopper. Each of the valves is, at its side which is in advance as the disk rotates, connected to the cell-disk by means of a hinge 69, so that the instant the rear edge of the valve passes the extremity 70 of the track 66 the valve will fall away, as shown in Fig. 9, and thus open the bottom of the cell and permit its contents to fall. As soon as the valve comes in contact with the extremity 71 of the track it will be closed. Preferably the rear wall of the cell is cut away, as shown at 72, and the object of this is to prevent the valve from mashing the raisin or other article between it and the bottom of the cell in case the raisin should fail to fall.

As shown more clearly in Fig. 9, those portions of the face of the cell-disk which are adjacent the forward sides of the cells are depressed, as shown at 73, and the object of this depression is to facilitate the entrance of the raisin into the cell. It will be seen that the cell-disk is inclined, and this is important, as it very materially facilitates the entrance of the raisin into the cell. By inclining it there is a constant agitation and tumbling of the raisins, and of course the more they are agitated the more liable they are to enter the cells. The feeder is supported by an arm 74 of the frame, and the disk 66 forms its base or foundation. The cell-disk derives its motion from the pinion 35 through the medium of gearing 75, 76, and 77 and a shaft 78, the gearing being so timed with relation to the number of cells and the operation of the seeding mechanism that one of the cells drops its contents each time the plunger is withdrawn.

I am aware that prior to my invention it had been proposed to use in a raisin-seeder a seed-receiver (not a pulp-receiver) made up of pins set at close intervals and converging toward their outer ends, a sufficient number of such pins being used to cover an area equal to or greater than that of the raisin. In this seed-receiver the pins were placed a sufficient distance apart to admit the seeds between them, and the outer portion of each of the pins was of a double conical shape for the double purpose of facilitating the entrance of the seed between them and retaining the seed.

I am also aware that prior to my invention it was proposed to use in a raisin-seeder four or five parallel pins arranged in a group and operating in conjunction with a plate having correspondingly-arranged perforations, the intention of the inventor being that each of the pins should operate to force one seed through one of the perforations. Neither of these devices is the equivalent of my pulp-receiver, which consists, essentially, of parallel pins, as distinguished from converging pins, having intervening spaces too small for the admission of raisin-seeds, a sufficient number of such pins being used to cover an area equal to or greater than that of the raisin.

With a pulp-receiver made up of parallel pins the pulp may be impaled and ejected without being torn, the only marks upon the fruit being the perforations made by the pins, but with a pulp-receiver made up of converging pins the pulp is torn to an objectionable extent.

I am the first to use in a raisin-seeder a plurality of pulp-receivers such as described carried by an intermittently-moving part and a coöperating seeding device adapted to operate with first one and then another of said pulp-receivers. I am also the first to use in a raisin-seeder a pulp-receiver such as described in combination with an elastic pad for impaling the pulp upon said receiver while the seeds are left on the outside thereof in position to be dislodged by a suitably-arranged scraper.

I have described the subject of the present invention as being an improvement in raisin-seeders, but it is obvious that it may be used for seeding any similar small fruit.

Having thus described my invention, the following is what I claim as new therein and desire to secure by Letters Patent:

1. In a raisin-seeder the combination of a pulp-receiver and an elastic impaling device, said pulp-receiver consisting of a number of pins set over an area at least as great as the area of the fruit to be seeded and with intervening spaces insufficient to admit the seeds, and means securing them together, each pin being parallel with every other pin, substantially as set forth.

2. A fruit-seeder having in combination, a pulp-receiver consisting of a number of pins set over an area at least as great as the area of the fruit to be seeded, and with intervening spaces insufficient to admit the seeds, each pin being parallel with every other pin, means securing them in place, an impaling device having an elastic working surface, means for relatively moving the pulp-receiver and impaling device toward and from each other, and means confining said movement to a direction parallel with the pins of the pulp-receiver, substantially as set forth.

3. In a fruit-seeder, the combination of two coöperating seeding devices, one consisting of a number of pins set over an area at least as great as the area of the fruit to be seeded and with intervening spaces insufficient to admit the seeds, all of said pins terminating at their working extremities in the same plane, and each pin being parallel with every other pin, and means for moving said coöperating seeding devices relatively toward and from each other in a direction perpendicular to their working surfaces, substantially as set forth.

4. In a fruit-seeder, the combination of a movable part, means for moving it intermittently, a plurality of pulp-receivers carried by it and consisting of a number of pins set over an area at least as great as the area of the fruit to be seeded and with intervening spaces insufficient to admit the seeds, and a seeding device adapted to coöperate with first one and then another of the pulp-receivers, substantially as set forth.

5. In a fruit-seeder, the combination of a plunger carrying a seeding device, a movable part, a plurality of pulp-receivers carried thereby and consisting of a number of pins set over an area at least as great as the area of the fruit to be seeded, and with intervening spaces insufficient to admit the seeds, and means for intermittently moving said part and bringing first one and then another of the pulp-receivers in operative relation to the seeding device of the plunger, substantially as set forth.

6. In a fruit-seeder, the combination of a plunger, a seeding device carried thereby, a part mounted to move about an axis, a plurality of pulp-receivers carried thereby each consisting of a number of pins set over an area at least as great as the area of the fruit to be seeded and with intervening spaces insufficient to admit the seeds, and means for intermittently moving said part and bringing first one and then another of the pulp-receivers in operative relation to the seeding device of the plunger, substantially as set forth.

7. In a fruit-seeder, the combination of a revoluble part, a plurality of pulp-receivers carried thereby and consisting of a number of pins set over an area at least as great as the area of the fruit to be seeded, and with intervening spaces insufficient to admit the seeds, a seeding device adapted to coöperate with the pulp-receivers, and means for intermittently revolving said part and thereby bringing first one and then another of the pulp-receivers in operative relation to the coöperating seeding device, substantially as set forth.

8. In a fruit-seeder the combination of a revoluble disk, a plurality of pulp-receivers carried thereby and consisting of a number of closely-set pins having their outer ends terminating in the plane of the face of the disk, means for intermittently revolving the disk, and a seeding device adapted to coöperate with first one and then another of the pulp-receivers, substantially as set forth.

9. In a fruit-seeder the combination of a revoluble disk, a plurality of pulp-receivers carried thereby consisting of a number of closely-set pins having their outer ends terminating in the plane of the face of the disk, a seeding device adapted to coöperate with first one and then another of the pulp-receivers, and a seed-scraper located with its edge in close proximity to the surface of the disk, substantially as set forth.

10. In a fruit-seeder the combination with a pulp-receiver and a cradle for sustaining the raisin opposite it, of an impaling device extending both above and below the bottom of the cradle, substantially as set forth.

11. In a fruit-seeder the combination with a pulp-receiver and a cradle for sustaining the raisin opposite it, of an elastic pad extending both above and below the bottom of the cradle, substantially as set forth.

12. In a fruit-seeder the combination with a pulp-receiver of a cradle consisting of a number of rods, a plunger and an elastic pad carried by the plunger and adapted to impale the raisin upon the pulp-receiver, said pad being provided above its bottom margin with openings through which pass the rods of which the cradle is formed, substantially as set forth.

13. In a fruit-seeder the combination with a pulp-receiver of a plunger having an undercut groove in its face and an elastic pad having a flange or tongue occupying said groove, substantially as set forth.

14. In a fruit-seeder, the combination with a plurality of pulp-receivers having interstices and means for forcing the pulp thereinto, of a movable part by which the pulp-receivers are carried, means for moving said part intermittently, a reciprocable pulp-ejector occupying the interstices of each of the pulp-receivers, and means for alternately projecting and withdrawing the pulp-ejectors, substantially as set forth.

15. In a fruit-seeder, the combination of a plurality of pulp-receivers, each having interstices and means for forcing the pulp thereinto, of a revoluble part carrying said pulp-receivers, a reciprocating pulp-ejector occupying the interstices of each of the pulp-receivers, and a circular cam disposed around the axis about which said revoluble part moves for alternately projecting and withdrawing the pulp-receivers, substantially as set forth.

16. In a fruit-seeder the combination of a pulp-receiver having interstices into which the pulp is forced, a revoluble part carrying said pulp-receiver, means for intermittently revolving said part, an ejector occupying the interstices of the pulp-receiver, a finger projecting from the ejector and a circular cam-groove into which said finger projects, whereby the ejector is operated, substantially as set forth.

17. In a fruit-seeder the combination of a pulp-receiver having interstices into which the pulp is forced, a movable part by which said pulp-receiver is carried, means for intermittently moving said part, a pulp-ejector occupying the interstices of the pulp-receiver, a stem on the pulp-ejector, a socket in the movable part aforesaid in which said stem fits whereby the pulp-ejector is guided in its movement, and a cam for operating the ejector, substantially as set forth.

18. In a fruit-seeder the combination with two coöperating seeding devices, of a plunger by which one of said seeding devices is carried and means for adjusting the relative positions of said seeding devices, substantially as set forth.

19. In a fruit-seeder the combination with two coöperating seeding devices, of a plunger by which one of said devices is carried, a cam for operating said plunger and means for adjusting the position of the cam whereby the seeding devices are adjusted relatively to each other, substantially as set forth.

20. In a fruit-seeder the combination of two coöperating seeding devices, a plunger by which one of them is carried, a cam for operating said plunger, a shaft by which said cam is carried, and means for adjusting the shaft endwise and thereby adjusting the seeding devices with relation to each other, substantially as set forth.

21. In a fruit-seeder the combination of a plurality of seeding devices, a movable part by which they are carried, means for intermittently moving said part, a seeding device adapted to coöperate with first one and then another of the seeding devices aforesaid, a hopper for containing the fruit, means for discharging the fruit therefrom into the path of the seeding device last aforesaid, and means for operating said discharging means after each operation of said seeding device last aforesaid, substantially as set forth.

22. In a fruit-seeder the combination of a plurality of seeding devices, a movable part by which they are carried, means for intermittently moving said part, a seeding device adapted to coöperate with first one and then another of the seeding devices first aforesaid, a feeder having a valve for controlling the discharge of the contents of the cell, and means for opening said valve after each operation of the seeding device, substantially as set forth.

FRANK HOWARD CHASE.

Witnesses:
L. M. HOPKINS,
S. E. SHARON.